US009597999B2

(12) United States Patent
Hoffmann

(10) Patent No.: US 9,597,999 B2
(45) Date of Patent: Mar. 21, 2017

(54) METHOD FOR CONTROLLING A LIGHT DISTRIBUTION OF A HEADLAMP AND HEADLAMP THEREFOR

(71) Applicant: HELLA KGaA Hueck & Co., Lippstadt (DE)

(72) Inventor: Ingo Hoffmann, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 206 days.

(21) Appl. No.: 14/492,169

(22) Filed: Sep. 22, 2014

(65) Prior Publication Data

US 2015/0085507 A1    Mar. 26, 2015

(30) Foreign Application Priority Data

Sep. 23, 2013 (DE) .......................... 10 2013 219 095

(51) Int. Cl.
| | | |
|---|---|---|
| *B60Q 1/00* | (2006.01) | |
| *F21V 21/28* | (2006.01) | |
| *F21V 21/29* | (2006.01) | |
| *B60Q 1/08* | (2006.01) | |

(52) U.S. Cl.
CPC ........ *B60Q 1/085* (2013.01); *B60Q 2300/056* (2013.01); *B60Q 2300/32* (2013.01)

(58) Field of Classification Search
CPC .............. B60Q 1/085; B60Q 2300/056; B60Q 2300/32
USPC .......................... 362/465, 464, 466, 538, 539
See application file for complete search history.

(56) References Cited

U.S. PATENT DOCUMENTS

| | | | |
|---|---|---|---|
| 2011/0025849 A1* | 2/2011 | Buchberger | F21S 48/1773 348/148 |
| 2013/0175926 A1* | 7/2013 | Katsuno | B60Q 1/085 315/82 |
| 2014/0249715 A1 | 9/2014 | Faber et al. | |
| 2014/0268846 A1* | 9/2014 | Nakazato | F21S 48/1145 362/510 |

FOREIGN PATENT DOCUMENTS

| | | | |
|---|---|---|---|
| DE | 10 2008 022 856 A1 | 11/2009 | |
| DE | 10 2010 015 731 A1 | 10/2011 | |
| DE | EP 2380774 A1 * | 10/2011 | ............. B60Q 1/085 |
| DE | 10 2011 081 397 A1 | 2/2013 | |

OTHER PUBLICATIONS

Machine English Translation of EP2380774A1 Oct. 26, 2011.*
German Search Report, Appl. No. 10 2013 219 095.6, Feb. 28, 2014, 5 pgs.

* cited by examiner

*Primary Examiner* — Anh Mai
*Assistant Examiner* — Glenn Zimmerman
(74) *Attorney, Agent, or Firm* — Paul D. Strain, Esq.; Strain & Strain PLLC

(57) ABSTRACT

The invention relates to a method for controlling a light distribution of a headlamp, wherein the headlamp has at least one light-emitting element, wherein the at least one light-emitting element is individually drivable in order to generate an individual luminous flux, wherein the light emitted by the at least one light-emitting element has a light distribution, wherein the light distribution is defined by means of a predefined, three-dimensional basic distribution on the basis of parameters, wherein an adapted light distribution is varied on the basis of the basic distribution using selected, changed parameters.

21 Claims, 3 Drawing Sheets

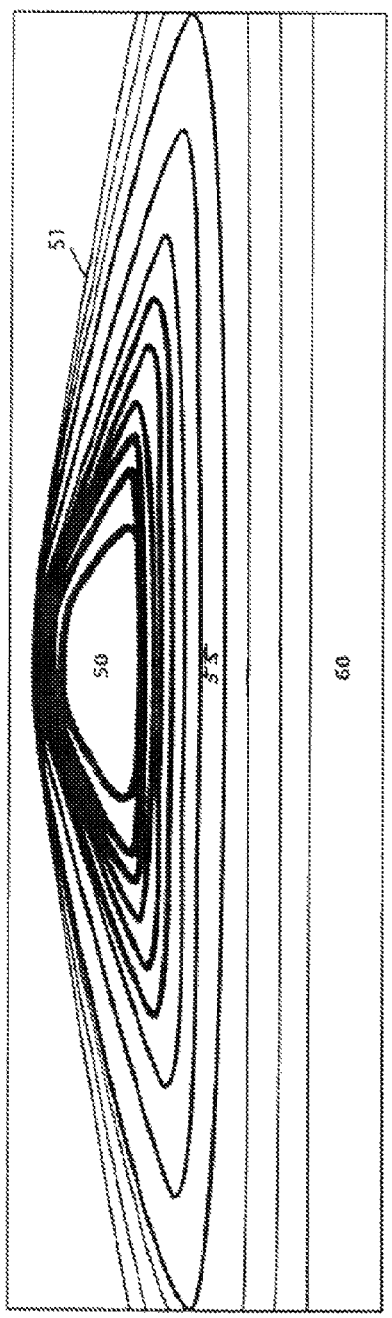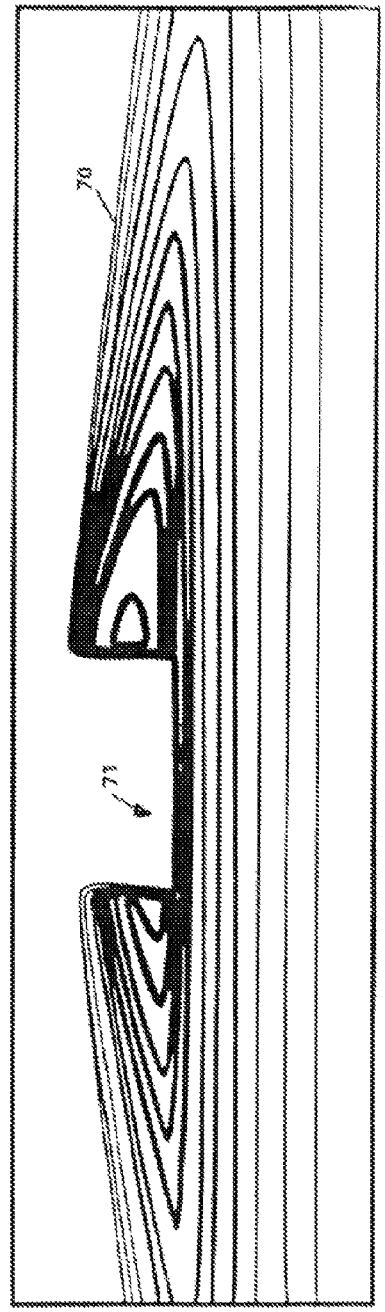

METHOD FOR CONTROLLING A LIGHT DISTRIBUTION OF A HEADLAMP AND HEADLAMP THEREFOR

CROSS-REFERENCE TO RELATED PATENT APPLICATIONS

This application is based upon and claims the benefit of priority from prior German Patent Application No. 10 2013 219 095.6, filed Sep. 23, 2013, the entire contents of which are incorporated herein by reference in their entirety.

TECHNICAL FIELD

The invention relates to a method for controlling a light distribution of a headlamp, in particular of a motor vehicle, and to such a headlamp.

PRIOR ART

Headlamps used nowadays have few permanently defined, alternately usable light distributions, such as, for example, lower beam, upper beam, highway light, wherein these light distributions are predetermined permanently by the available light-emitting elements.

For this purpose, current headlamps can cut out more angular regions from the upper beam distribution in order to avoid glare or rotate the light-emitting means by means of stepper motors in order to generate a cornering light.

This no longer meets today's requirements for the illumination of the lane or road in front of the vehicle.

DESCRIPTION OF THE INVENTION, PROBLEM, SOLUTION, ADVANTAGES

The object of the invention consists in providing a method for controlling a light distribution of a headlamp which enables improved illumination of the road in various operating states and ambient or environmental conditions.

The total light distribution, merely referred to below as light distribution, results from the superimposition of the individual light distributions of the individual light-emitting elements.

The problem in respect of the method is solved by the features of claim 1.

An exemplary embodiment of the invention relates to a method for controlling a light distribution of a headlamp, wherein the headlamp has at least one light-emitting element, wherein the at least one light-emitting element is individually drivable in order to generate an individual luminous flux, wherein the light emitted by the at least one light-emitting element has a light distribution, wherein the light distribution is defined by means of a predefined, three-dimensional basic distribution on the basis of parameters, wherein an adapted light distribution is varied on the basis of the basic distribution using selected, changed parameters. Correspondingly, it is possible to respond individually and quickly to changing conditions in the environment, on the road, of the overall lighting situation and/or of the road users in order to correspondingly match the light distribution. For this purpose, a basic distribution of the light distribution is assumed, which is defined on the basis of a large number of parameters, wherein the basic distribution is adapted in order to achieve a real light distribution to be driven.

In this case, it is especially advantageous if, in order to determine the basic distribution, a three-dimensional lighting model is used for illuminating the environment to be lit, wherein the parameters of the basic distribution are determined on the basis of the requirements for the illumination of the environment. The environment can in this case in particular be understood to mean the surrounding area which is relevant to the vehicle driver and is lit properly by the headlamp system of the dedicated vehicle, preferably the road or the lane or the trajectory of the dedicated vehicle, in particular also including further environmental conditions, such as the properties of the road and the adjacent regions, other objects, as appear in the region of the road, for example, other road users, obstacles etc.

Furthermore, it is advantageous if at least one preset is used in the determination of the basic distribution. In particular, it is advantageous if a set of rules which correspond to at least one manufacturer, customer and/or to at least one country, for example, can be selected for the determination of the basic distribution. In this case, it is advantageous if only those basic distributions which can be combined with the presets are or can be generated when selecting a set of roles or if, during the generation, reference is made to light distributions or regions of the light distributions which are inconsistent with the presets.

It is particularly advantageous if the environment to be lit is described by means of a predefined environment model. For this purpose, a model of the environment is generated in order to be able to use this model of the environment to determine the adapted light distribution.

In this case, it is particularly expedient if the environment model takes into consideration the following factors:

- the 3D surfaces in the surrounding area, such as lateral and vertical profile of the roadway or the predicted trajectory of the specific vehicle, road side, side development or vegetation cover,
- proportion of the reflection of the emitted light back in the direction of the driver's eye, in particular taking into consideration the parallaxes between the lighting angle and viewing angle and the angular difference between the surface normal and the lighting angle, in particular depending on the material, color, possibly fog,
- the position and dynamics of objects for which glare suppression would be required,
- the position and dynamics of retroreflectors.

It is particularly expedient if, during determination of the adapted light distribution, environmental parameters are taken into consideration as parameters for describing the environment to be lit.

It is also expedient if at least one or more of the following parameters are used as parameters of the basic distribution:

- the defined profile of the longitudinal illumination in front of the headlamp up to a predefined distance,
- the defined profile of the lateral illumination in front of the headlamp,
- lateral and/or longitudinal lighting model in the forefield of, such as in particular in the vicinity of, the vehicle,
- the definition of an upper beam spot,
- direction and characteristic of upper beam spots, dependence thereon of the driving lane profile and change in position and deformation thereof in this regard,
- profile of the driving lane to be lit taking into consideration the road profile, such as in particular the vertical and/or lateral profile and the profile of the trajectory of the specific vehicle and/or a combination of the profiles of the road profile and/or the trajectory, constant parameterization of the transition region between the upper beam spot and the forefield as a function of the solid angle, or the three-dimensional position of defined illuminances, definition of a transition region between illumination of the roadway and the upper beam spot, individual or multiple glare suppression regions and forms for reducing the intensity of the light as a function of the solid angle, the distance from the object and the local headlamp intensity.

It is particularly advantageous if the environment model describes the environment in terms of parameters which are determined by means of sensor input data and/or communication input data.

Furthermore, it is expedient if environmental parameters, vehicle parameters and/or glare suppression parameters are used as the parameters.

It is also advantageous if it is possible to use the following as environmental parameters:

presence of a type of road (highway, urban road, extraurban road), road profile (relative to the vehicle, lateral and/or vertical), predicted vehicle trajectory, driving dynamics of the vehicle, traffic situation, hazards, weather conditions, visual conditions, external lighting, contrast, daylight, and/or ambient luminosity.

It is furthermore expedient if the following are usable as vehicle parameters:

vehicle position, vehicle orientation, velocity, set driving parameters, driver profile, and/or vehicle trajectory.

It is also advantageous if the following are usable as glare suppression parameters:

position of other vehicles, position of group of other vehicles, position of road users, position of retroreflectors, dynamics of other vehicles, dynamics of group of other vehicles, dynamics of road users, and/or dynamics of retroreflectors.

In accordance with the invention, it is expedient if sensor input data are made available by at least one sensor.

It is also expedient if communication input data are made available by communication devices and/or control units.

It is particularly advantageous if, in order to determine an adapted light distribution, the basic distribution is matched to the environment to be illuminated, the glare suppression regions and/or to the lighting reduction regions, wherein the adapted light distribution is based on the basic distribution by adaptation of parameters.

In this case, it is particularly advantageous if the parameters of the environment are mapped onto the parameters and/or the variable quantities of the basic light distribution in order to determine an ideal three-dimensional light distribution which is adequate for the situation.

As an alternative or in addition, it is advantageous to determine a three-dimensional light distribution which is adequate for the situation and which corresponds to at least one preset. In particular, it is advantageous if a set of rules which correspond, for example, to at least one manufacturer, customer and/or to at least one country, can be selected for determining the three-dimensional light distribution. In this case, it is advantageous if, when selecting a set of rules, only those three-dimensional light distributions which are consistent with the presets are or can be generated or if, during the generation, reference is made to light distributions or regions of the light distributions which are inconsistent with the presets. In this case, it is particularly advantageous if the presets correspond to those for the generation of the basic light distribution or are related thereto.

It is also advantageous if different parameters of the environment model can have different effects on at least one parameter of the light distribution, wherein the effects are combined to give a joint parameter change.

It is particularly advantageous if the individual effects are weighted individually during the determination of the joint parameter change.

Furthermore, it is advantageous if parameters of the environment model are mapped onto defined value ranges of the parameters of the light distribution. In particular it is advantageous if the defined value ranges of the parameters of the light distribution map the adherence to presets. These value ranges can be predefined, for example, or are restricted depending on other parameters, in particular the presently set value of at least one other parameter.

Furthermore, it is particularly advantageous if an adapted three-dimensional light intensity distribution is generated by means of the adaptive parameters of the light distribution.

It is also advantageous if transitions between light distributions can be configured differently in respect of perceptibility and design.

The problem in respect of the method is solved by the features of claim 20.

An exemplary embodiment of the invention relates to a fully adaptive headlamp comprising a matrix of light-emitting elements and/or comprising a matrix of shield elements, wherein the light-emitting elements and/or the shield elements are individually drivable in order to drive an individual luminous flux of a light-emitting element, wherein the three-dimensional light distribution of the headlamp is defined by means of a predefined basic distribution, wherein an adapted light distribution is variable on the basis of the basic distribution using selected parameters.

The headlamp is characterized in particular by the fact that a method according to the invention as detailed above can be implemented.

It is particularly advantageous if the maximum lighting results from a combination of possible light distributions.

Further advantageous configurations are described by the description of the figures below and by the dependent claims.

BRIEF DESCRIPTION OF THE DRAWINGS

The invention will be explained in more detail below on the basis of at least one exemplary embodiment with reference to the drawings, in which:

FIG. 3 shows a basic light distribution, and FIG. 4 shows an adapted light distribution for cornering with a glare suppression region.

PREFERRED EMBODIMENT OF THE INVENTION

Figure 1:
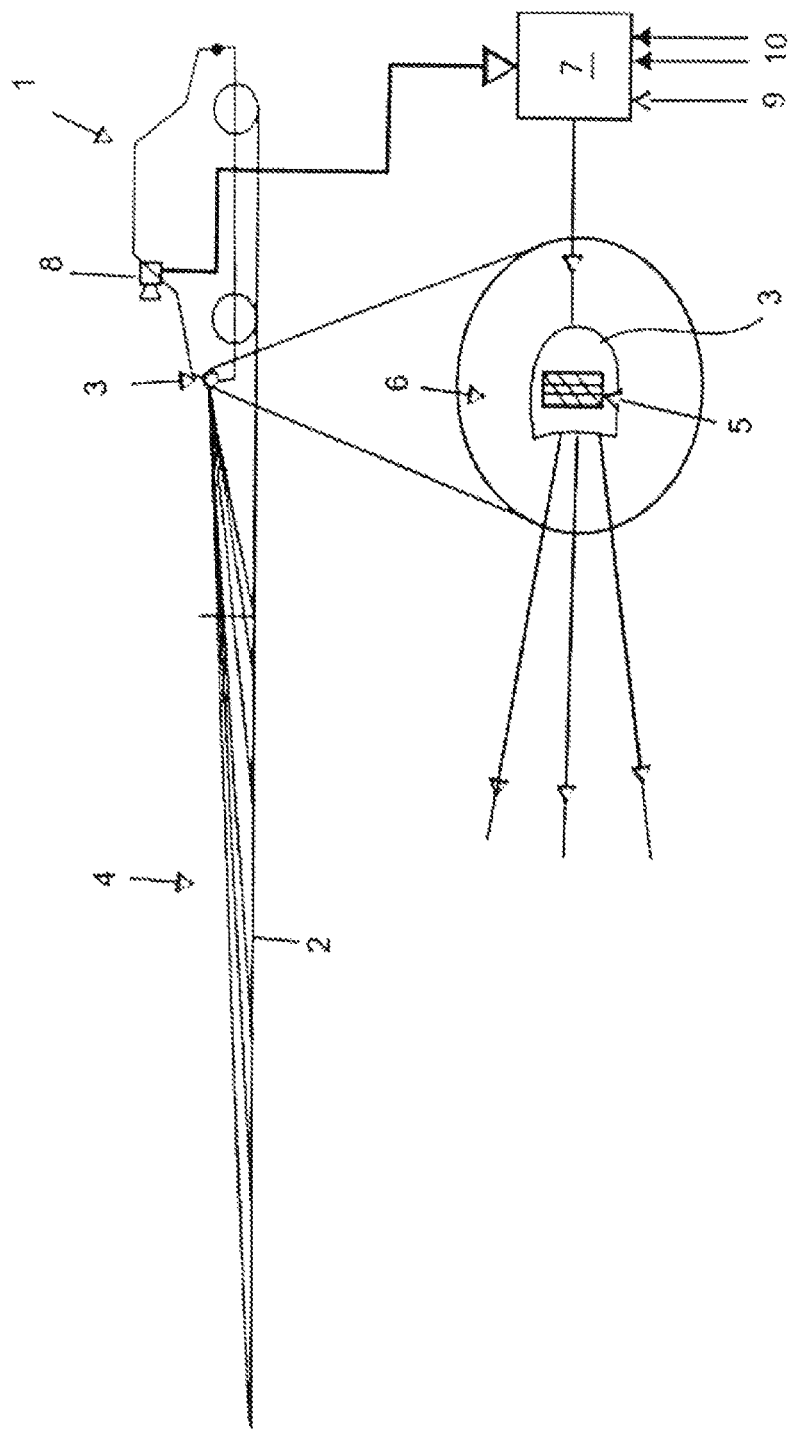
FIG. 1 shows a schematic view of a motor vehicle comprising a headlamp for illuminating the driving lane.

FIG. 1 shows a motor vehicle 1 on a road or on a driving lane 2 of the road, wherein the motor vehicle 1 has at least one headlamp 3, for illuminating the driving lane 2. The headlamp in this case is used for generating a light distribution 4, by means of which the driving lane 2 and possibly regions in the surrounding area thereof.

In this case, the headlamp is preferably a headlamp comprising a light-emitting means and/or comprising a multiplicity of light-emitting means and/or comprising a shield and/or comprising a multiplicity of shield elements, in particular a headlamp comprising a matrix 5 of light-emitting elements and/or comprising a matrix of shield elements, wherein the light-emitting elements and/or the shield elements are individually drivable in order to drive an individual luminous flux of a light-emitting element. In addition or as an alternative, optical elements, such as mirror and/or lens elements, can be provided in order to influence the light distribution.

In this case, the three-dimensional light distribution of the headlamp is defined by means of a predefined basic distribution, wherein, owing to environmental conditions or other influencing conditions, the actual light distribution is generated by adaptation from the basic light distribution. For this purpose, an adapted light distribution is varied on the basis of the basic distribution using selected parameters.

In this case, the light-emitting elements 5, in particular matrix 6 of light-emitting elements, are driven by means of a control unit 7, wherein the control unit determines or recognizes the basic light distribution on the basis of a set of parameters in this regard and determines the adapted light distribution on the basis of varied parameters from the basic light distribution. In this case, the light-emitting elements are then driven in such a way that the adapted light distribution results.

In order to determine the present conditions, the control unit 7 can receive data or signals from sensors 10 and/or other devices 8 or control units 9. Thus, for example, data or signals can be received from an installed camera 8 in order to determine the ambient conditions.

Furthermore, the control unit 7 can read at least one stored set of rules from the memory, which is not illustrated. This can take place, for example, depending on data and/or signals from sensors 10 and/or other devices 8 or in a predefined manner. In particular, in this case location information and/or customer/manufacturer data can be taken into consideration.

Figure 2:
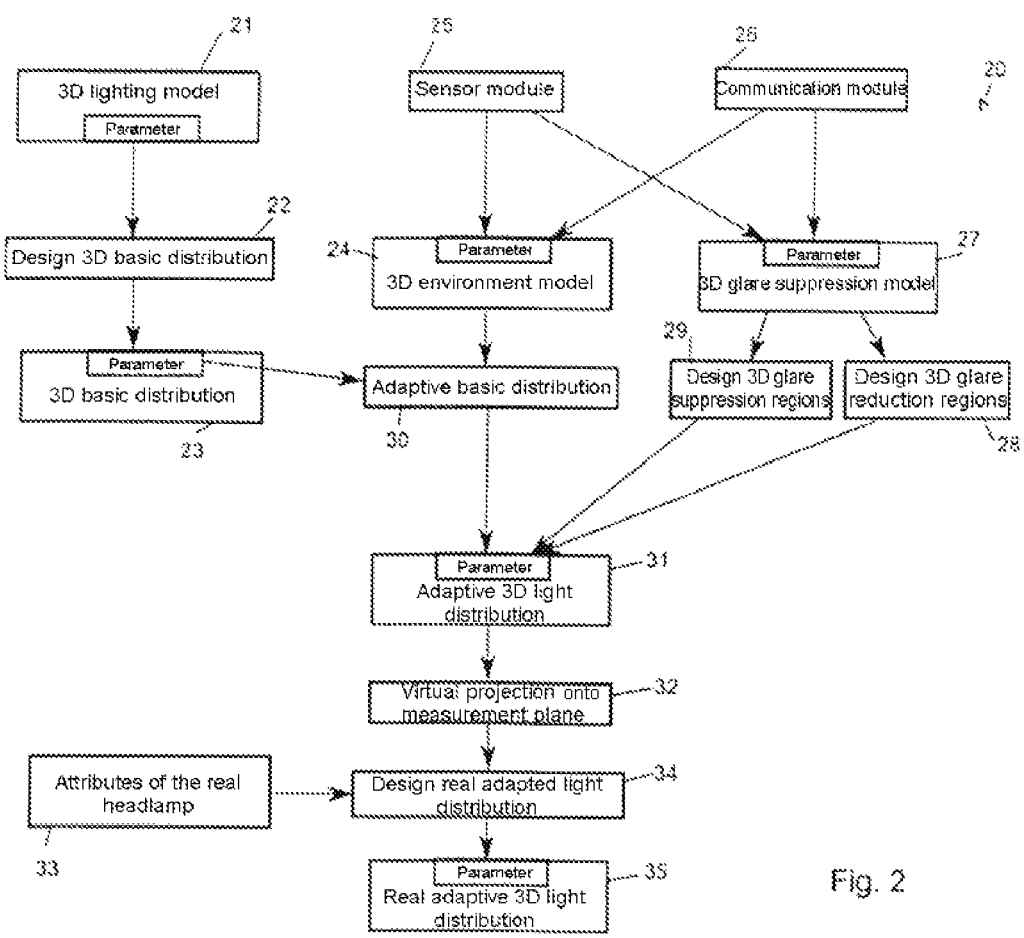
FIG. 2 shows a block circuit diagram for illustrating the method according to the invention.

FIG. 2 shows a block circuit diagram 20 for explaining the method according to the invention.

In this case, the method relates to a method for controlling a light distribution of a headlamp, wherein the headlamp has at least one light-emitting element or a multiplicity of light-emitting elements, preferably a matrix of light-emitting elements, which are individually drivable. As a result, an individually drivable luminous flux is generated in order to be able to generate an adaptable light distribution in front of the motor vehicle 1.

In accordance with the invention, the light distribution is defined by means of a predefined three-dimensional basic distribution on the basis of parameters. In this case, at least one preset can be taken into consideration. In block 21, a three-dimensional lighting model is generated on the basis of a set of parameters, wherein, by means of a design 3D basic light distribution according to block 22, a three-dimensional basic light distribution with the parameters in this regard according to block 23 is defined on the basis of the lighting model according to block 21.

An adapted light distribution is varied in accordance with the invention on the basis of the basic distribution according to block 23 using selected varied parameters.

In order to determine the basic light distribution, correspondingly a three-dimensional lighting model is used for illuminating the environment to be lit (see block 21), wherein the parameters of the basic light distribution are determined on the basis of the requirements for the illumination of the environment.

As an alternative or in addition, at least one preset can be used to determine the basic light distribution. This preset can be present in particular in the form of at least one set of rules which restricts the value ranges of the parameters and/or the selection of the lighting model or the design. The set of rules can in this case relate to all selectable parameters, in particular to parameters of the lighting model (see block 21) and/or of the three-dimensional basic light distribution (see block 23).

In this case, at least one or more of the following parameters are used as parameters of the basic distribution:
the defined profile of the longitudinal illumination in front of the headlamp up to a predefined distance,
the defined profile of the lateral illumination in front of the headlamp,
lateral and/or longitudinal lighting model in the forefield of, such as in particular in the vicinity of, the vehicle,
the definition of an upper beam spot,
direction and characteristic of upper beam spots, dependence thereon of the driving lane profile and change in position and deformation thereof in this regard,
profile of the driving lane to be lit taking into consideration the road profile, such as in particular the vertical and/or lateral profile and the profile of the trajectory of the specific vehicle and/or a combination of the profiles of the road profile and/or the trajectory,
constant parameterization of the transition region between the upper beam spot and the forefield as a function of the solid angle, or the three-dimensional 3D position of defined illuminances to be achieved,
definition of a transition region between illumination of the roadway and the upper beam spot, and/or
individual or multiple glare suppression regions and forms for reducing the intensity of the light as a function of the solid angle, the distance from the object and the local headlamp intensity.

The environment to be lit is described by means of a predefined environment model. This environment model is described in block 24 on the basis of a set of parameters in this regard comprising corresponding parameters. The input data for the environment model is received by the model from sensors, control units or other devices (see blocks 25, 26). In this case, block 25 represents, as sensor module, sensors and control units, for example, and block 26 represents, as communication module, control units and other devices such as camera, navigation device, radar device etc. The data and/or signals of blocks 25, 26 are supplied to the environment model in block 24.

In this case, it is advantageous if the environment model takes into consideration the following factors:
the 3D surfaces in the surrounding area, such as lateral and vertical profile of the roadway or the predicted trajectory of the specific vehicle, road side, side development or vegetation cover, proportion of the reflection of the emitted light back in the direction of the driver's eye, in particular taking into consideration the parallaxes between the lighting angle and viewing angle and the angular difference between the surface normal and the lighting angle, in particular depending on the material, color, possibly fog, the position and dynamics of objects for which glare suppression would be required, and/or the position and dynamics of retroreflectors.

Correspondingly, environmental parameters are taken into consideration in the determination of the adapted light distribution as parameters for describing the environment to be lit.

In accordance with the invention, the environment model describes the environment by means of parameters which can be determined by means of sensor input data and/or communication input data (see blocks 25, 26). In this case, environmental parameters, vehicle parameters and/or glare suppression parameters are used as parameters.

In order to determine the environment using the environment model in block 24, it is possible to use the following as environmental parameters:

presence of a type of road (highway, urban road, extra-urban road), road profile (relative to the vehicle, lateral and/or vertical), predicted vehicle trajectory, driving dynamics of the vehicle, traffic situation, hazards, weather conditions, visual conditions, external lighting, contrast, daylight, and/or ambient luminosity.

The following are usable as vehicle parameters:

vehicle position, vehicle orientation, velocity, set driving parameters, driver profile, and/or vehicle trajectory.

In block 27, the way in which the light distribution should be subjected to glare suppression because, for example, other road users or the like have been determined which should not be subjected to glare is determined using the glare suppression model. In this case, a three-dimensional glare suppression model which is based on a set of parameters comprising glare suppression parameters is determined in block 27. The glare suppression model receives data and/or signals, as does the environment model already, from blocks 25 and 26.

The following are usable as glare suppression parameters:

position of other vehicles, position of group of other vehicles, position of road users, position of retroreflectors, dynamics of other vehicles, dynamics of group of other vehicles, dynamics of road users, and/or dynamics of retroreflectors.

From the glare suppression model according to block 27, the regions to be subjected to glare suppression are defined in block 29. In this case, the configuration thereof is also defined. The glare suppression model likewise defines those regions which have reduced lighting, i.e. lighting reduction regions, in order to achieve reduced glare; see block 28.

In block 30, an adapted basic light distribution is determined from the three-dimensional basic light distribution and the three-dimensional environment model. The determination can in this case take place optimally and/or taking into consideration presets. For this purpose, a set of rules, for example relating to the respective customers, manufacturers and/or regions, can be selectable. In particular, the permissible value ranges of the parameters can be preset by the corresponding set of rules.

In block 31, an adapted three-dimensional light distribution is determined from the three-dimensional basic light distribution according to block 30 and the regions to be subjected to glare suppression according to block 29 and the regions with reduced lighting according to block 28. In this case, the determination can take place optimally and/or taking into consideration presets. For this purpose, a set of rules, for example relating to the respective customers, manufacturers and/or regions, can be selectable.

In order to determine an adapted light distribution, the basic light distribution is matched to the environment to be illuminated, the glare suppression regions and/or to the lighting reduction regions, wherein the adapted light distribution originates from the basic distribution by adaptation of parameters.

In this case, the parameters of the environment are mapped onto the parameters and/or the changeable variables of the basic light distribution in order to determine an ideal three-dimensional light distribution which is adequate for the situation. As an alternative or in addition, a three-dimensional light distribution which is adequate for the situation and corresponds to the presets of the selected set of rules can be determined. The mapping of the parameters can therefore take place depending on a selected set of rules. In particular, the permissible value ranges of the parameters can be preset by the corresponding set of rules. The set of rules can in this case relate to all parameters used, in particular to the parameters of the adapted three-dimensional light distribution; see block 31.

In block 32, a virtual projection of the adapted three-dimensional light distribution onto the measurement plane then optionally takes place.

In particular, it is necessary to take into consideration if different parameters of the environment model, for example, can have different effects on at least one parameter of the light distribution. In this case, for example, one parameter can require a reduction in the luminosity at a specific solid angle, while another parameter could require an increase in the luminosity. In such a case, a common parameter change is implemented, wherein the two affected parameters are taken into consideration combined, for example. For this purpose, averaging of the effects or weighting can be performed or a parameter is left unconsidered, while the other parameter is taken into full consideration etc. are combined. The individual effects can also be weighted individually in the determination of the common parameter change.

Furthermore, it is necessary to take into consideration the fact that, when mapping parameters, not every change to the glare suppression model, for example, has an effect on at least one parameter of the light distribution. In particular owing to the fact that presets are taken into consideration, it is possible for specific changes in the traffic in the surrounding area to have no effect on the light distribution since this already exhausts the possibilities permitted by the preset.

According to block 33, the respective headlamp has individual attributes which are based on the basis of its manufacture and make. These attributes can influence the light distribution to be generated because, for example, certain luminosities or light colors cannot be represented or can only be represented to a restricted extent.

In block 34, the influencing of the adapted light distribution as a result of the headlamp and its attributes the real light distribution owing to the headlamp design is generated, which results in the real adapted light distribution with its parameters in block 35. In other words, the real light distribution is generated on the basis of the individual properties of the headlamp. It is thus possible to use any desired headlamp types interchangeably.

Of all the light distributions which the real headlamp is capable of generating, those which comes close or closest to the adapted three-dimensional light distribution, taking into consideration the legal provisions, should be selected.

In this case, transitions between various adapted light distributions in respect of perceptibility and design are configurable differently, such as in particular the speed of the transition.

FIG. 3 illustrates a light distribution on the basis of a linear model. In this case, the lines 51 are lines of the same luminosity, wherein the center 50 is the region with the greatest luminosity and the luminosity decreases towards the outside towards regions 55 and 60. FIG. 3 illustrates a standard light distribution, as would be usable for a lower beam, an upper beam or a motorway light, for example. A light distribution which is symmetrical from right to left and has its maximum luminosity at a defined distance in front of the vehicle is shown.

FIG. 4 illustrates an adapted light distribution 70, likewise on the basis of a linear model, which adapted light distribution has, in respect of glare suppression, a region 71 with glare suppression and the light distribution 70 is furthermore shifted as such towards the left owing to cornering travel.

The maximum lighting of the headlamp is the lighting which the headlamp is at most capable of providing.

The invention claimed is:

1. A method for controlling a light distribution in an environment comprising:
   providing a headlamp in a motor vehicle, wherein the headlamp comprises a light emitting element, wherein the light emitting element is individually drivable, wherein the light emitting element generates an individual luminous flux and forms a portion of the light distribution,
   detecting a set of parameters relating to the environment and the vehicle and having a predefined basic light distribution,
   adapting the selected predefined basic light distribution using the set of parameters to produce an adapted three-dimensional light distribution,
   individually driving the at least one light emitting element to adjust the light distribution to match the adapted three-dimensional light distribution.

2. The method according to claim 1,
   further comprising using the set of parameters to determine the characteristics of the environment and selecting the predefined basic light distribution using a three-dimensional lighting model for illuminating the environment, wherein the requirements of the basic light distribution are determined using of the requirements for illuminating the environment.

3. The method according to claim 1, wherein the predefined basic light distribution is selected using at least one of the following sets of parameters:
   (1) a defined profile of the longitudinal illumination in front of the headlamp up to a predefined distance,
   (2) a defined profile of the lateral illumination in front of the headlamp,
   (3) a lateral or a longitudinal lighting model in a forefield of a vehicle,
   (4) a definition of an upper beam spot,
   (5) a direction and characteristic of upper beam spots and a dependence thereon of the driving lane profile and change in position and deformation thereof,
   (6) a profile of the driving lane to be lit including a vertical or a lateral profile and a profile of the trajectory of the specific vehicle,
   (7) a transition region between an upper beam spot and a forefield as a function of a solid angle or a three-dimensional position of defined illuminances,
   (8) a transition region between illumination of a roadway and an upper beam spot, and
   (9) individual or multiple glare suppression regions and forms for reducing the intensity of the light as a function of a solid angle, a distance from the object, and a local headlamp intensity.

4. The method according to claim 1,
   further comprising obtaining at least one parameter using sensor input data from at least one sensor.

5. The method according to claim 1,
   further comprising obtaining at least one parameter using communication input data made available by communication devices or control units.

6. The method according to claim 1,
   further comprising determining an adapted light distribution by matching the basic distribution to the environment to be illuminated, glare suppression regions, or to lighting reduction regions and adapting the basic distribution using parameters.

7. The method according to claim 1,
   further comprising mapping environmental parameters onto parameters or variable quantities of the basic light distribution to determine an ideal three-dimensional light distribution for a driving situation.

8. The method according to claim 1,
   wherein different parameters of the environment model can have different effects on at least one parameter of the light distribution, wherein the effects are combined to give a joint parameter change.

9. The method according to claim 1, wherein an adapted three-dimensional light intensity distribution is generated using the adaptive parameters of the light distribution.

10. The method according to claim 2,
    wherein the environment is defined by a predefined environment model.

11. The method according to claim 3,
    wherein an environment model describes the environment in terms of environment parameters which are determined using sensor input data or communication input data.

12. The method according to claim 8,
    wherein the individual parameters are weighted individually during the determination of the joint parameter change.

13. The method according to claim 9,
    wherein transitions between light distributions can be configured differently in respect of perceptibility and design.

14. The method according to claim 10, wherein the predefined environment model uses at least one of the following sets of parameters:
(1) parameters relating to 3D surfaces in the surrounding area selected from the group consisting of a lateral and a vertical profile of a roadway, a predicted trajectory of the vehicle, a road side, a side development, and a vegetation cover,
(2) parameters relating to a proportion of the reflection of the emitted light back in the direction of the driver's eye selected from the group consisting of a parallax between a lighting angle and a viewing angle, an angular difference between the surface normal and the lighting angle, a color, and a fog,
(3) a position and dynamics of objects for which glare suppression would be required, and
(4) a position and dynamics of retroreflectors.

15. The method according to claim 11,
wherein environmental parameters, vehicle parameters, or glare suppression parameters, are used as the environment parameters.

16. The method according to claim 11,
wherein the environmental parameters comprise one or more parameters selected from the group consisting of:
a presence of a highway, an urban road, or an extra-urban road,
a road profile relative to the vehicle,
a predicted vehicle trajectory,
a driving dynamic of the vehicle,
a traffic situation,
a hazard,
a weather condition,
a visual condition,
an external lighting,
a contrast,
a daylight, and
an ambient luminosity.

17. The method according to claim 15,
wherein the vehicle parameters comprise one or more parameters selected from the group consisting of:
a vehicle position,
a vehicle orientation,
a velocity,
a set driving parameters,
a driver profile, and
a vehicle trajectory.

18. The method according to claim 15,
wherein the glare suppression parameters comprise one or more parameters selected from the group consisting of:
a position of other vehicles,
a position of a group of other vehicles,
a position of road users,
a position of retroreflectors,
a dynamic of other vehicles,
a dynamic of group of other vehicles,
a dynamic of road users, and
a dynamic of retroreflectors.

19. A headlamp comprising a matrix of light-emitting elements or a matrix of shield elements, wherein the light-emitting elements or the shield elements are each individually drivable in order to produce an individual luminous flux, wherein the light emitted by the light-emitting elements has a light distribution, wherein the light distribution is defined by a predefined three-dimensional basic distribution selected from a plurality of a predefined basic light distributions, wherein an adapted light distribution is variable on the basis of the basic distribution using selected parameters.

20. The headlamp according to claim 19,
wherein the maximum lighting results from a combination of possible light distributions.

21. A method for controlling a light distribution in an environment comprising:
providing a headlamp in a motor vehicle, wherein the headlamp comprises a light emitting element, wherein the light emitting element is individually drivable, wherein the light emitting element generates an individual luminous flux, wherein the individual luminous flux forms a portion of the light distribution,
detecting a set of parameters relating to the environment and the vehicle and using the set of parameters to select one of a plurality of a predefined basic light distributions, wherein the environment is defined by a predefined environment model, wherein the predefined environment model uses all of the following sets of parameters:
(1) one or more parameters relating to 3D surfaces in the surrounding area selected from the group consisting of a lateral and a vertical profile of a roadway, a predicted trajectory of the vehicle, a road side, a side development, and a vegetation cover,
(2) one or more parameters relating to a proportion of the reflection of the emitted light back in the direction of the driver's eye selected from the group consisting of a parallax between a lighting angle and a viewing angle, an angular difference between the surface normal and the lighting angle, a color, and a fog,
(3) a position and dynamics of objects for which glare suppression would be required, and
(4) a position and dynamics of retroreflectors,
adapting the selected predefined basic light distribution using the set of parameters to produce an adapted three-dimensional light distribution,
individually driving the at least one light emitting element to adjust the light distribution to match the adapted three-dimensional light distribution.

* * * * *